Dec. 15, 1964   A. H. BUSSEY ETAL   3,160,949
METHOD OF JOINING ELONGATED OBJECTS
Filed May 21, 1962

INVENTORS
ATLEE H. BUSSEY
BUD W. MORRIS
BY   HORACE W. RAY

ATTORNEY

United States Patent Office 3,160,949
Patented Dec. 15, 1964

3,160,949
METHOD OF JOINING ELONGATED OBJECTS
Atlee H. Bussey, Pasadena, Bud W. Morris, Anaheim, and Horace W. Ray, Pasadena, Calif., assignors to Aerojet-General Corporation, Azusa, Calif., a corporation of Ohio
Filed May 21, 1962, Ser. No. 196,388
13 Claims. (Cl. 29—421)

This invention relates to a method of joining elongated objects and more particularly to a novel and efficient method of connecting metal pipes, rods, or cables.

Heretofore, as described in United States Patent 2,367,206, it has been proposed to join metal pipes, rods, or cables by inserting their ends inside a closely fitting sleeve. Then one or more coils of an explosive such as Primacord are wrapped around the sleeve and when the Primacord detonates, the force of the explosion deforms the sleeve and the end portions of the pipe, rod, or cable inside the sleeve are locked together.

This method of joining pipes, which at first glance appears to be rapid and economical, has in practice, been unsatisfactory. This is because the amount of explosive required to deform the metal sleeve and the pipe so they lock together has been extremely critical. If too much Primacord is used, the metal sleeve and pipe may be cut through entirely. If too little Primacord is use, then the metal pipes will not be locked together. This difficulty in determining the critical or precise amount of Primacord required to successfully lock the pipes inside the metal sleeve has so far made the method described in the above-identified patent impractical. Nevertheless, if some means could be found to broaden the critical limits in the amount of Primacord or other elongated flexible explosive which can be used to join the metal pipes, the above-described technique could become practical.

What is needed, therefore, and comprises an important object of this invention, is to provide a practical technique for explosively joining elongated metal objects together.

The invention in its broadest aspect is based on the discovery that when a unit of explosive consisting of two properly spaced coils of a flexible elongated explosive, wrapped in side-by-side relationship around a tube, is exploded, the shock waves produced by the explosion of each coil reinforce each other and exert a greater force over a wider surface area of the tube than is obtainable by using a single coil of the explosive, or by using multiple coils of explosive without regard to the spacing of the coils. This reinforcement of shock waves is termed the Mach stem effect. Since the Mach stem effect causes the shock waves to exert a greater force over a wider area of surface in comparison to the shock wave produced by a single coil, the likelihood of tearing or cutting the tube is reduced and the upper and lower limits of the amount of explosive required to lock the ends of the pipes or other elongated objects inside the tube are increased.

This and other objects of this invention will become more apparent when read in the light of the accompanying specification and drawings wherein.

Figure 1:
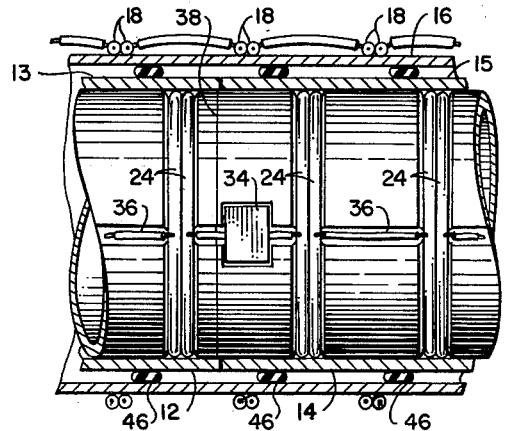
FIGURE 1 is a longitudinal sectional, view partially in elevation, of the end portions of a pair of metal pipes shown abutting against each other inside a sleeve and with the explosive coils positioned to lock the pipe ends and the sleeve together.

Referring now to FIGURE 1 of the drawings, the end portions 12 and 14 of pipes 13 and 15 which are to be joined together, are shown inserted inside the connector sleeve 16. Although the pipes in the particular embodiment shown are metal, it is contemplated that this method can be practiced with other ductile materials.

Figure 7:
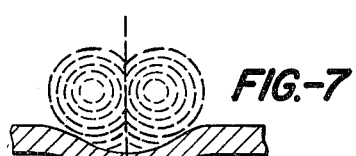
FIGURE 7 is a schematic longitudinal sectional view disclosing the shock wave pattern formed by the detonation of the high explosive charges and their interaction together to form a comparatively broad recess or deformation in the sleeve.

One or more units of explosive, each comprising double loop or coils 18 of Primacord or other elongated flexible explosive, are wrapped around the outer surface of sleeve 16. The separation between the loops in each unit of explosive material is such that when the loops are simultaneously detonated, the Mach stem effect caused by the interaction of the shock waves produced by the explosion of each loop results in a broadened reinforced shock wave directed radially inward against the outer surface of sleeve 16 (see FIGURE 7). The force resulting from the impact of this broadened reinforced shock wave on the outer surface of the sleeve will be greater than the force obtainable when a single loop of explosive is used. In addition, the greater force is directed over a larger surface area of the sleeve in comparison to the area affected when a single loop of explosive or a plurality of loops of improperly spaced explosives are used. As a result, the broadened shock wave has a tendency to deform the sleeve, whereas the force resulting from the detonation of a single loop of explosives or a plurality of improperly spaced explosive are each directed against a narrow area of the sleeve and have a cutting effect. Consequently, the amount of explosive required to couple the end portions of the pipes inside the sleeve 16 is not critical when two loops of properly spaced explosive are used, and is extremely critical when a single loop or a plurality of improperly spaced loops of explosive are used.

With this arrangement, when the coils 18 on the outer surface of the sleeve 16 are exploded, they form circular grooves 20 on the outer surface of sleeve 16 and corresponding shaped grooves 22 in the outer surface of end portions 12 and 14 of the pipes 13 and 15. This locks the end portions 12 and 14 inside sleeve 16.

Under some circumstances, as when the pipes are used for carrying fluids or gases under high pressure, the explosion of a single unit comprising a double coil of Primacord on the outer surface of the sleeve may not produce a sufficiently strong connection. This weakness can be overcome by positioning additional units inside the bores or openings in the end portions 12 and 14 of the pipes 13 and 15 (see FIGURE 1). It is noted that these inner units of explosive are in axially spaced relationship to the coils 18 on the outer surface of sleeve 16 and are held against the inner surface of the end portions 12 and 14 of the pipes by any suitable means.

Figure 3:
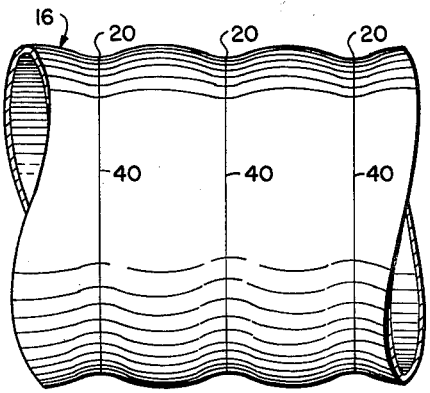
FIGURE 3 is an elevational view of the sleeve joining the ends of the pipes and showing the deforming effect of the explosives and the index lines for properly positioning the explosive coils thereon.
Figure 4:
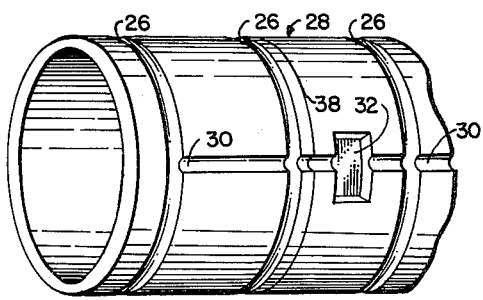
FIGURE 4 is a perspective view of a holder for the explosive coils which is adapted to be inserted inside the adjacent ends of the pipes.

In the embodiment shown, a tubular support member 28 (see FIGURE 4) with radially inward coil-receiving grooves 26 provides simple means for properly positioning the double coils of explosive 24 inside end portions 12 and 14 of the pipes. With the position of the double coils 24 inside the tubes precisely determined by means of the tubular support member 28, the double coils 18 can be properly located on the external surface of sleeve 16 by means of index marks 40 on sleeve 16 (see FIGURE 3).

Figure 5:
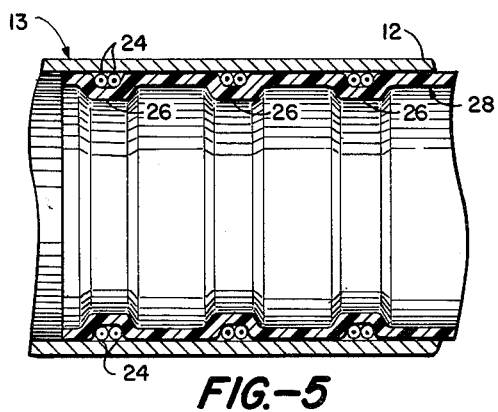
FIGURE 5 is a longitudinal sectional view showing the explosive holder with double strands of high explosive positioned in the circumferentially disposed grooves inside the end of one of the metal pipes.

To explosively join the pipe sections together, the double coils of explosive 24 are inserted in grooves 26 which are designed to maintain the proper separation between the explosive coils for the Mach stem effect (see FIGURE 5). These grooves 26, connected together by a connecting groove 30, also communicate with a recess 32 for holding a sympathetic detonator 34 (see FIGURES 1 and 4). The tubular support member 28 with the explosive coils 24 mounted in grooves 26 and the connecting wires or explosive train 36 in groove 30, and the sympathetic detonator 34 in recess 32, may be packaged as a unit.

When the ends of the pipe to be joined are brought close together, the tubular support member 28 with the explosives and detonator already mounted thereon is inserted inside the adjacent end portions 12 and 14 of the pipes 13 and 15. The tubular support member 28 may be properly positioned inside the pipes by suitable indexing marks 38 formed on its surface (see FIGURE 4). In this embodiment, the index mark 38 is closely adjacent the plane joining the end portions of the pipes 12 and 14 (see FIGURE 1).

To practice the method with the apparatus disclosed in the drawings, the tubular support member 28, with coils 24 in grooves 26 and with the sympathetic detonator 34 in position in recess 32, is first inserted in end portion 12 of pipe 13 to where the index mark 38 coincides with the edge of the end portion 12. Next, sleeve 16 is inserted over the end portion 12 of pipe 13 and is moved far enough so that the end portion 14 of pipe 15 can be moved over a part of tubular support member 28 and brought into abutting relationship with the edge of end portion 12 of pipe 13.

Figure 6:
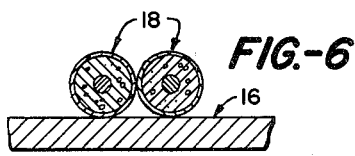
FIGURE 6 is a longitudinal sectional view of a portion of the sleeve with double strands of explosives positioned thereon.

In this way, the tubular support member 28 with the double coils of explosive 24 in grooves 26 will be precisely positioned inside end portions 12 and 14 of the pipes. Next, the sleeve 16 is moved back over the junction of end portion 12 and end portion 14, and is positioned by means of indexing marks (not shown) on the outer surfaces of pipes 13 and 15. After this, double strands 18 of explosive are wrapped on the outer surface of sleeve 16 in positions indicated by index marks 40 (see FIGURE 3). With this arrangement, the double coils 24 within the interior of end portions 12 and 14 of the pipes and the double coils 18 on the outer surface of sleeve 16 will be in axially spaced relationship to each other, and each of the coils in each double coil will be properly spaced from each other so that when they are detonated, the Mach stem effect will deform the sleeve and the pipes. In the particular embodiment shown, the Mach stem effect occurs when the loops of Primacord or sheet explosive in string-like form such as Mild Detonating Fuse, Flexible Sheet Explosive EL506A, made by the Du Pont Company, or pentaerythritol tetranitrate, are in abutting relationship (see FIGURE 6). It is, however, to be understood that this is not a necessary condition and the proper spacing of the explosive loops depends primarily on the nature of the explosive.

Figure 2:
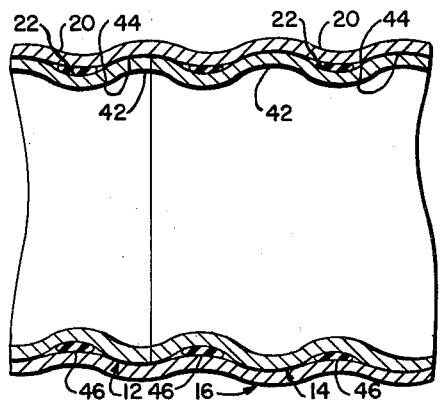
FIGURE 2 is a longitudinal sectional view showing the pipes locked together after the detonation of the explosive coils, and shows O-rings positioned between the facing surfaces of the pipes and sleeve to provide a fluid-tight seal.

When the end portions 12 and 14 of the metal pipes 13 and 15 inside sleeve 16 are in the position shown, the double coil explosives 24 and 18 may be exploded simultaneously or separately by any suitable means. Although, in the embodiment shown, sympathetic detonator 34 ignites the double strands 24, suitable electronic devices could be devised so that the detonator 34 could ignite the double strands 24 at a controlled time after double strands 18 have been ignited. When double coils 18 explode, they form grooves 20 and 22, as described above, in the sleeve and in the outer walls of the end portions 12 and 14 of pipes 13 and 15. When the double strands 24 explode, they form radially outwardly extending grooves 42 and 44 in the walls of the end portions 12 and 14 of the pipes 13 and 15 and in the connecting sleeve 16 (see FIGURE 2), producing corrugations in the end portions 12 and 14 of the pipes and in the sleeve 16, whereby the end portions of the pipes will be tightly locked together inside sleeve 16.

If a fluid-tight seal is required, O-rings 46 could be placed on the outer surfaces of the end portions 12 and 14 of pipes 13 and 15. As shown in FIGURE 1, the O-rings 46 are positioned axially intermediate the double coils 18 and 24. With this arrangement, when the double coils of explosive 18 and 24 are detonated, they explode, interlocking the sleeve 16 and the walls of the end portions 12 and 14 of the pipes together, with the O-rings 46 tightly compressed between the outer surface of the wall of the respective pipe and the inner surface of the sleeve 16. This forms a fluid-tight seal between the pipes 13 and 15 and the sleeve 16.

It is to be understood that the form of the invention herewith shown and described is to be taken as a preferred example of the same, and that various changes in the shape, size, and arrangement of the parts may be resorted to without departing from the spirit of this invention or the scope of the claims.

We claim:

1. In a method of joining two objects of ductile material, the steps of inserting one of said objects into an opening in the second object, and placing high explosive charges in contact with a surface of the outer object, said high explosive charges comprising at least one unit of two strands of an elongated flexible explosive, and said strands positioned sufficiently close to each other in side-by-side relationship so that when the strands are exploded, the Mach stem effect causes the shock waves produced from each strand of explosive to interact to provide a broadened reinforced shock wave which deforms the surface of the outer object and forces it inwardly on the inner object and thereby effects a junction of said outer object and said inner object.

2. In a method of joining at least two adjacent objects of ductile material the steps of surrounding projecting parts of said objects with a connecting element shaped to encompass said projecting parts at areas of contact, and placing high explosive charges around and substantially in form fitting contact with the outside of the connecting element at each of said contact areas, said high explosive charges comprising at least one unit of two strands of an elongated flexible explosive, and said strands positioned sufficiently close to each other in side-by-side relationship so that when the strands are exploded, the Mach stem effect causes the shock waves produced from each strand of explosive to interact to provide a broadened reinforced shock wave which deforms both the connecting element and the adjacent objects at said contact areas to thereby effect a junction of said objects.

3. In a method of joining at least two elongated objects, the steps of surrounding terminal portions of said objects with a connecting element having hollow portions at least at the ends thereof for the reception of the terminal portions of said elongated objects, and positioning high explosive charges around the outside of said connecting element at each of the areas where said connecting element surrounds said objects, said high explosive charges comprising at least one unit of two strands of elongated flexible explosive, and said strands positioned sufficiently close to each other in side-by-side relationship so that when the strands are exploded, the Mach stem effect causes the shock waves produced from each strand of explosive to interact to provide a broadened reinforced shock wave which deforms the surface of said connecting element and forces it inwardly on the terminal portions of the objects to be joined, thereby effecting a junction of said elongated objects.

4. In the method described in claim 3 wherein said objects comprise metal cables and said connecting element comprises a metal sleeve.

5. In the method described in claim 3 wherein said objects comprise metal rods and said connecting element comprises a metal sleeve.

6. In the method described in claim 4 wherein said objects comprise metal pipes and said connecting element comprises a metal sleeve.

7. In a method of joining at least two elongated objects where at least the terminal portions of said objects have axial bores and the terminal portion of one object can fit generally snugly inside the bore in the terminal portion of the other object, comprising the steps of placing high explosive charges in the bore of said one object against the inner surface thereof, and placing high explosive charges on the outer surface of said other object in axially spaced relation to the high explosive charges inside said bore in said one object and over said bore in said one object, the high explosive charges inside the bore of said one object and on the outer surface of the other object each comprising double strands of an elongated flexible explosive, and the strands positioned sufficiently close to each other so that when the double strands on the inner surface of said one object and the double strands of the outer surface of the other object are detonated, the Mach stem effect resulting from the detonation of each strand in the double strands of high explosive charges causes the shock waves from each strand to interact and provide a broadened reinforced shock wave which joins the two elongated objects together.

8. In the method described in claim 7 and in addition, the step of placing an O-ring on the outer surface of said one object bearing against the inner surface of the bore of said other object, said O-ring being positioned axially between the high explosive charges in the bore of said one object and the high explosive charges on the outer surface of said other object, whereby when the high explosive charges are detonated to lock the elongated objects together, the O-ring is squeezed between the outer surface of said one object and the inner surface of the bore of said other object to provide a fluid-tight seal between said objects.

9. In a method of joining at least two hollow pipes which comprises inserting the ends of adjoining pipes within a sleeve, surrounding said sleeve with a first double coil of elongated flexible explosive over the terminal portion of one pipe and surrounding said sleeve with a second double coil of elongated flexible explosive over the terminal portion of said other pipe, inserting at least one double coil of flexible explosive in the interior of a terminal portion of one pipe against the inner surface thereof and in axially spaced relationship to said first double coil of elongated flexible explosive, and inserting at least one double coil of elongated flexible explosive in the interior of the other pipe against the inner surface thereof, and in axially spaced relationship to the second double coil of flexible explosive surrounding the portion of the sleeve into which said other pipe is inserted, the coils comprising each double coil of flexible explosive positioned sufficiently close to each other so that when the double coils are exploded, the Mach stem effect resulting from the detonation of each coil causes the resulting shock waves to interact and provide a broadened reinforced shock wave which forms interlocking corrugations in the ends of the pipes and in the sleeve which joins them together.

10. In the method described in claim 9 wherein the flexible explosive used is Primacord.

11. In the method described in claim 9 wherein the flexible explosive used is Mild Detonating Fuse.

12. In the method described in claim 9 wherein the flexible explosive used is pentaerythritol tetranitrate.

13. In the method described in claim 9 and in addition, the step of positioning at least one O-ring on the outer surface of one pipe bearing against the inner surface of the sleeve into which the one pipe is inserted and positioning at least another O-ring on the outer surface of the other pipe bearing against the inner surface of said sleeve into which the other pipe is inserted, said O-rings being in axially spaced relationship to said double coils, whereby when the coils are detonated, locking the pipes and sleeve together, the O-rings are squeezed between the pipes and the sleeve to provide a fluid-tight connection between the pipes.

References Cited in the file of this patent
UNITED STATES PATENTS
2,367,206    Davis _____ Jan. 16, 1945